Feb. 26, 1963    C. M. SWEET    3,078,547
LATHE CUTTING TOOLS
Filed April 22, 1957    2 Sheets-Sheet 1

INVENTOR
Corlise M. Sweet
BY Andrus & Sceales
ATTORNEYS.

Feb. 26, 1963 C. M. SWEET 3,078,547
LATHE CUTTING TOOLS
Filed April 22, 1957 2 Sheets-Sheet 2

INVENTOR
Corlise M. Sweet
BY
ATTORNEYS.

United States Patent Office 3,078,547
Patented Feb. 26, 1963

3,078,547
LATHE CUTTING TOOLS
Corlise M. Sweet, 1000 E. Montana St., Milwaukee, Wis.
Filed Apr. 22, 1957, Ser. No. 654,247
5 Claims. (Cl. 29—97)

This invention relates to lathe cutting tools and to holders therefor.

With the ever increasing demand for heavier and faster cuts the problems of tool material and wear become of increasing importance. Studies have shown that in some instances a reduction in the speed of cut of a tool by as much as thirty-five percent will increase the tool life some sixteen times.

The present invention takes advantage of this gain in tool life, and by providing a plurality of adjacent tool cutting elements operating simultaneously in tandem accomplishes a total cut greater than heretofore advisable with a single tool or cutting element, and without time loss and with less wear on the individual cutting elements.

While it has been proposed heretofore to employ a plurality of cutting tools in tandem, the special adjustable mountings for the tools were impractical because of excessive overhang and space requirements preventing cutting into corners in the workpiece.

The present invention employs cutting elements that are constructed to enable the holder to securely grip the shanks of the cutting elements within the dimensional limits present in a lathe. In carrying out this phase of the invention the tool shank is of standard construction and the cutting elements are disposed with the cutting edge directed at substantially the most efficient angle to provide for cutting of the rotating workpiece on center by each cutter.

Another phase of the invention provides a positive adjustment for one cutting element relative to the other on ways both longitudinal and laterally of the tool whereby the relative depth of cut may be adjusted for the cutting elements.

The invention may employ either a turret or a special mounting for external cutting or facing.

The accompanying drawings illustrate various embodiments of the invention and the several aspects thereof presently contemplated to be the best mode of carrying out the invention.

Figure 1:
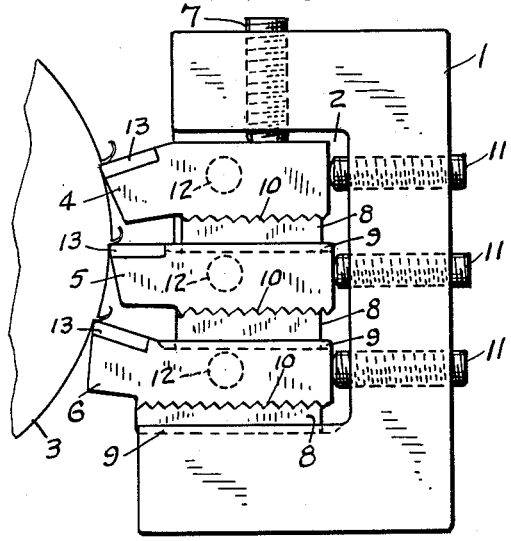
FIGURE 1 is a schematic outline of a tool set in side elevation showing three cutting elements in tandem, each being separately adjustable both toward the work and laterally.
Figure 2:
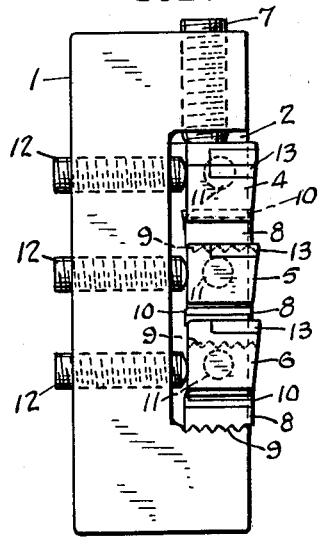
FIG. 2 is a similar outline of the tool set of FIGURE 1 in end elevation.

In the construction illustrated in FIGURES 1 and 2, the tool block 1 has a recess 2 in one side opening towards the workpiece 3 and adapted to receive a plurality of cutting elements, there being three such cutting elements 4, 5 and 6 in the illustration.

The cutting elements 4, 5 and 6 are disposed one below the other and are clamped securely in recess 2 by means of the holddown screw 7 threaded downwardly through the top of block 1 and into engagement with the top of element 4.

Each cutting element is preferably supported upon a guide block 8. The lowermost guide block 8 rests upon the bottom of recess 2 and supports the lower cutting element 6; the middle guide block 8 rests upon the lower cutting element 6 and supports the middle cutting element 5; and the upper guide block 8 rests upon the middle cutting element 5 and supports the upper tool 4.

The lower surface of each guide block 8 is serrated to provide longitudinally extending ways 9 which match a corresponding complemental supporting surface in each instance. The upper surface of each guide block 8 is serrated to provide transversely extending ways 10 which match a complemental lower surface of the corresponding cutting element supported thereby.

Each cutting element is made individually adjustable in a longitudinal direction toward the work axis by means of a micrometer screw 11 threaded through the back of the tool block 1 and into engagement with the end of the corresponding cutting element. Turning of screw 11 will move the corresponding cutting element and its supporting guide block 8 along the longitudinal way 9 thereof.

Each cutting element is made individually adjustable in a transverse direction generally parallel to the work axis by means of a micrometer screw 12 threaded through the side of the tool block 1 and into engagement with the side of the corresponding cutting element. Turning of a screw 12 will move the corresponding cutting element laterally on ways 10 on its supporting guide block.

Each cutting element 4, 5 and 6 comprises a body or shank which is clamped as described, and a hard cutting insert 13 having its cutting edge shaped to face the round work-piece 3 on the radius at the point of cut so that the cutting element cuts substantially on center. As illustrated, the middle cutting element 5 has its cutting edge formed on is insert 13 facing the work at a proper cutting angle as related to the radius of the workpiece at the point of cut. Similarly, the upper cutting element 4 has its cutting edge formed in its insert 13 facing the work at a proper cutting angle as related to the radius of the workpiece at the point of cut, and the lower cutting element 6 has its cutting edge formed in its insert 13 facing the work at a proper cutting angle as related to the radius of the workpiece at the point of cut.

The cutting elements 4, 5 and 6 are not interchangeable, and are each specially constructed to provide for centerline cutting for each element, as above described.

The small amount of adjustment of the longitudinal position for each cutting element is not enough to materially interfere with this center-line cutting of the workpiece.

Figure 3:
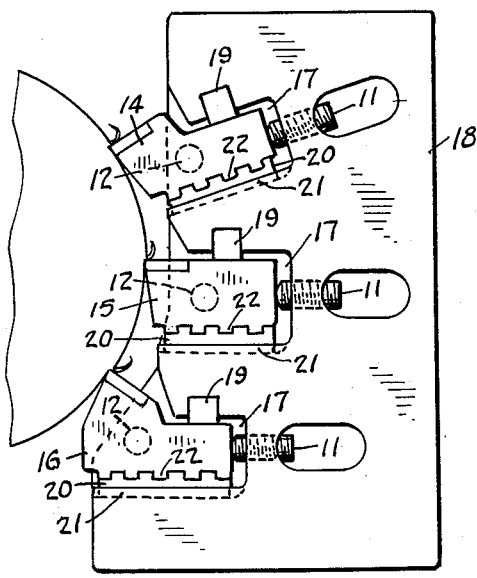
FIG. 3 is a similar outline of another construction in side elevation showing the cutting elements mounted independently in the tool holder.
Figure 4:
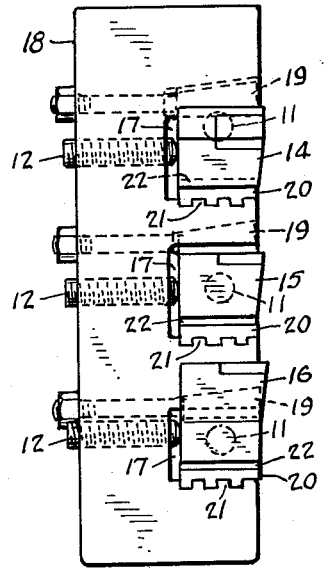
FIG. 4 is an end elevation of the construction of FIG 3.
Figure 5:
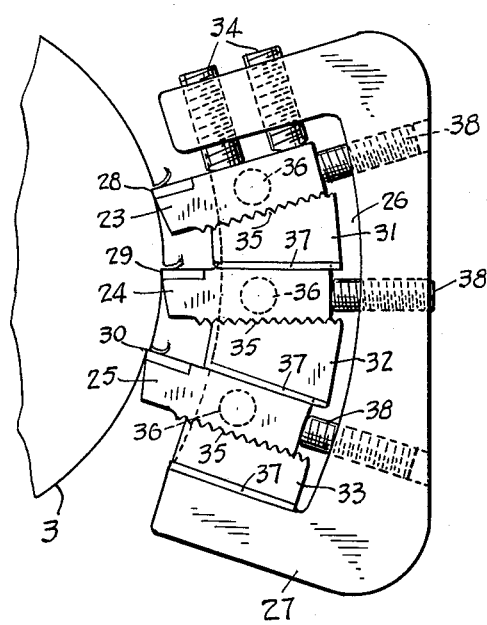
FIG. 5 is a schematic outline of another construction in side elevation and showing cutting elements mounted in tandem and having angular guide blocks therebetween.
Figure 6:
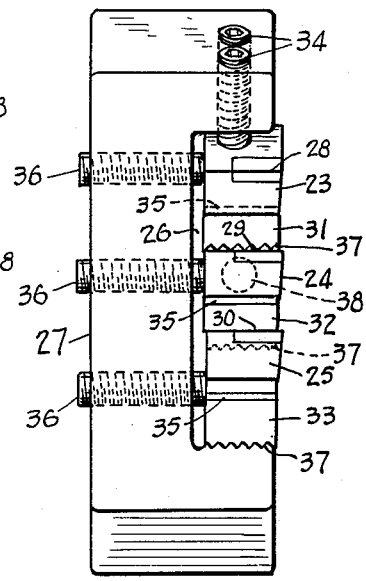
FIG. 6 is an end elevation of the construction of FIG. 5.
Figure 7:
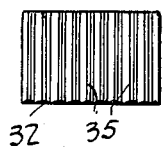
FIG. 7 is a plan view of a guide block of FIG. 5.
Figure 8:
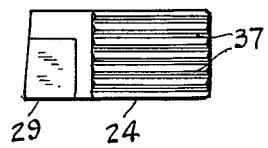
FIG. 8 is a plan view of a cutter shank which supports a guide block of FIG. 5.

In the construction of FIGS. 3 and 4, each of the cutting elements 14, 15 and 16 is individually clamped in its own recess 17 in the tool block 18 by means of a wedge bolt 19. A guide block 20 supports each cutting element separately and provides both longitudinal and transverse ways 21 and 22, respectively. The adjusting screws 11 and 12 function in this construction the same as they function in the structures of FIGURES 1 and 2.

The guideways for FIGS. 3 and 4 corresponding to guideways 9 and 10 of FIGURES 1 and 2, are shown as having a tongue and groove construction. Guideway 21 extends longitudinally of the tool and guideway 22 extends transversely of the tool.

The construction of FIGS. 3 and 4 provides for the independent adjustment of each cutting elment. The tool construction may be the same, i.e. cutting elements 14, 15 and 16 correspond generally to cutting elements 4, 5 and 6, respectively, previously described.

The construction of FIGS. 5 to 8 provides for the use of cutting elements 23, 24 and 25 which are interchangeable. The cutting elements are mounted in a single recess 26 in tool block 27 and are disposed at different relative angles to provide the desired angle of the corresponding cutting edges 28, 29 and 30 relative to the corresponding radii of the rotating workpiece at the respective cutting points.

For this purpose upper cutting element 23 is supported by a guide block 31 resting on cutting element 24, and tool 24 is supported by a guide block 32 resting on lower cutting element 25, and lower cutting element 25 is supported by a guide block 33 resting on the bottom of recess 26. All of the cutting elements 23, 24 and 25 and the guide blocks 31, 32 and 33 are clamped in place by clamp screws 34 threaded through the upper leg of the tool block 27 and into engagement with the top of cutting element 23.

The upper surface of each guide block 31, 32 and 33 and the lower surface of each cutting element 23, 24 and 25 have mating serrations extending laterally of the cutting elements to provide ways 35 for the separate lateral adjustment of each cutting element by means of the adjusting screws 36 threaded through one side of the tool holder 27 and into engagement with the rear side of each corresponding cutting element.

The lower surface of each guide block 31, 32 and 33 and its supporting surface have mating serrations extending longitudinally of the cutting elements to provide ways 37 for the separate longitudinal adjustment of each cutting element by means of the adjusting screws 38 threaded through the body of the tool block 27 and into engagement with the outer end of either the corresponding cutting element or the corresponding guide block.

In the construction shown the angular or wedge shaped guide blocks are secured against slipping outwardly under the clamping pressures on the assembly, by reason of the lateral ways 35 which secure each guide block against longitudinal movement relative to the cutting element supported thereby. The screws 38 prevent each cutting element and its associated supporting guide block from moving outwardly along ways 37 under the clamping pressures of screws 34.

In utilizing the invention, it is possible to adjust the cutting elements so that the first cutting element takes a large roughing cut and the second or final cutting element takes a small finishing cut. It is also possible to employ cutting elements of different hardness or toughness. The nose radius of the different cutting elements may vary, if desired.

In every case, the cutting elements are either specially constructed or mounted to provide for a proper center cut by each cutting element with the cutting edge disposed for the most efficient cut on the radius of the workpiece at the point of cut. This avoids problems of large tool blocks which require excessive space, and permits the cutting of different diameter workpieces where necessary.

The cutting elements are generally disposed at one side of the tool block so that they can cut up to a corner in the workpiece or close to the chuck without interference. By using carbide tool inserts, the full advantages of the invention can be obtained since with other constructions the mounting has been generally too weak to enable the full use of carbide tools. With the present invention, by mounting the cutting elements closely adjacent in the tool block the overhang is kept at a minimum and tool strength is conserved.

One of the advantages of the construction lies in the fact that the supporting guide blocks having their ways restricting movement of the cutting elements except in a predetermined adjustment direction, prevent any tendency of the cutting elements to turn in their mounting. The clamping forces need not be as great as in other types of tools.

Furthermore, the guide blocks only become important where tandem cutting elements are employed, in order to rigidly hold the cutting elements and provide for adjustment of one cutting element relative to another to control the relative bites of the cutting element. The screws for lateral adjustment of the cutting element in each instance are disposed on the side opposite the cutting edge to take the forward cutting forces and avoid interference with the work.

Where a plurality of tool cutting elements are employed in tandem as in the present invention, it is possible to cut metal much faster and at the same time give a better cutting action. In the tool holders shown, the cutting elements can be adjusted to cut on the same line or diameter as set forth in applicant's original application, Serial No. 264,548, filed on January 2, 1952, now abandoned in favor of this application and companion applications.

For maximum metal removal the cutting elements are all offset laterally from each other in the direction of feed so that the feed is divided between the cutting elements. In this way each cutting element will take the normal load for a single point tool, and the combination of the three cutting elements would remove metal three times as fast as a single tool.

The combination of the three cutting elements gives a resistance to chatter that is not available with a single tool. It is also possible to set the cutting elements at slightly different cutting angles and thereby further improve the smoothness of cut obtainable.

The life of the cutting elements is greatly improved with the described arrangement wherein each cutting element takes part in the cut in tandem feed relation since the individual tool load may be reduced.

In the construction of FIGS. 5 to 8 wherein angular guide blocks are employed between adjacent tool shanks, the lateral guide ways 35 additionally serve to retain each guide block with its associated tool cutting element supported thereby regardless of the angular relation of the guide blocks and cutting elements of the assembly.

Tandem cutting elements as provided by the invention require that one element be adjustable both laterally and longitudinally relative to the adjacent element of the assembly. It is possible that one tool cutting element of the assembly may be fixed and non-adjustable, although for convenience the illustrations show each tool cutting element as adjustable.

Where the workpiece to be machined may have hard and soft spots, as in the case of some castings, the present invention enables the employment of cutting elements of different hardness so that one will take the first cut containing the hard spots on the outside and the other will then cut the softer material below the surface. In this way problems encountered in holding the piece to size will be minimized. This provision of one hard cutting element and one tough cutting element gives a combined effect not possible with any single tool cutting element of today.

This application is a continuation-in-part of application Serial No. 264,548 filed by the present inventor on January 2, 1952, and now abandoned in favor of the present application and of companion applications.

Various embodiments of the invention may be employed within the scope of the accompanying claims which particularly point out and distinctly set forth the subject matter regarded as the invention.

I claim:

1. A tandem cutting tool comprising a tool holder having a recess therein, a plurality of cutting elements having grooved shanks and a separate position adjusting grooved way for each of said cutting elements all disposed in said recess in alternate stacked relationship and held therein by a clamp means carried by said holder, each said way being grooved in at least two different directions and interlocking with said grooves of one or more of said grooved shanks, and back-up adjusting means carried by said holder and engaging each said cutting element in alignment with said direction of said way grooves.

2. A tandem cutting tool comprising; a tool holder, at least two separate relatively elongated cutting elements held in over imposed relation one to the other by said holder and at least one adjustment positioning block between one of said cutting elements and said holder; said holder having adjustment supporting ways for said block, at least one of said elongated cutting elements having adjustment ways thereon transverse to its direction of elongation, said block having adjustment ways on one side that interfit with said holder supporting ways and ways on another side that interfit with said transverse ways of one of said cutting elements and are angularly disposed at approximately 90 degrees to said ways of said one side; said cutting elements being securely held by said holder with said positioning block supported on said holder supporting ways with said ways on said one block side interfitting therein and said one of said cutting elements supported on said other block side with the said ways thereof interfitting with said transverse ways of said cutting elements whereby at least one of said cutting elements may be adjusted in its elongated direction and transversely thereto relative to the other of said cutting elements.

3. The tandem cutting tool of claim 2 wherein the said cutting elements have a cutting point that extends from the said holder by distance to lie on a cylindrical surface common to said points of the cutting elements.

4. The tandem cutting tool of claim 3 wherein each said point is in an on center relation relative to a radius of said cylindrical surface.

5. The tandem cutting tool of claim 2 wherein the said tool holder has a separate recess for each of said cutting elements and each of said cutting elements is provided with and supported by a said adjustment positioning block in said tool holder and wherein each said cutting element is provided with a cutting rake surface relative to the remaining element surfaces with the said rake surface of each said cutting element being disposed at a different angle.

References Cited in the file of this patent

UNITED STATES PATENTS

| | | |
|---|---|---|
| 1,626,953 | Muller | May 3, 1927 |
| 1,733,657 | Ericson | Oct. 29, 1929 |
| 2,037,642 | Scribner | Apr. 14, 1936 |
| 2,348,052 | Boillat | May 2, 1944 |
| 2,805,468 | Williams | Sept. 10, 1957 |

FOREIGN PATENTS

| | | |
|---|---|---|
| 9,822 | Great Britain | Apr. 30, 1903 |
| 19,607 | Great Britain | Oct. 1, 1901 |
| 60,127 | Austria | July 10, 1913 |
| 331,351 | France | Sept. 10, 1903 |
| 419,319 | Italy | Mar. 20, 1947 |
| 489,041 | Germany | Jan. 13, 1930 |
| 617,343 | Germany | Aug. 16, 1935 |
| 1,084,955 | France | July 21, 1954 |